Jan. 10, 1928.

H. B. KIPPER 1,655,424

HEATING AND AGITATING APPARATUS

Filed Sept. 22, 1924    2 Sheets-Sheet 2

Inventor
Herman B. Kipper
By Frank E. Liurance, Jr.
Attorney

Patented Jan. 10, 1928.

1,655,424

UNITED STATES PATENT OFFICE.

HERMAN B. KIPPER, OF MUSKEGON, MICHIGAN.

HEATING AND AGITATING APPARATUS.

Application filed September 22, 1924. Serial No. 739,040.

This invention relates to an apparatus which is designed for the carrying out of certain processes, one of which may be the reduction of sodium sulphate to sodium sulphide by use of carbon in the form of coke; another the absorption of nitrogen by alkali salts in the presence of carbon and catalytic agents to produce alkali cyanides or other alkali nitrogenous compounds; and still another the production of sulphur trioxide or sulphuric anhydride from sulphur dioxide and oxygen from the air in the presence of a catalytic material such as iron oxide. There are many other processes which may be carried out by this apparatus than those mentioned and which will be somewhat more specifically outlined hereafter those mentioned being illustrative of the utility of the apparatus.

It is the primary object of this invention to provide an apparatus in which the speed of chemical reaction may be greatly increased with a resultant reduction of cost, thus enhancing the commercial value of the process and permitting the large quantity production of the products obtained through the employment of the reactions made possible by use of the apparatus. This result is achieved through the use of rapidly moving metallic hammer or beating elements which serve to thoroughly mix and simultaneously produce a grinding action on the materials used during the progress of the chemical reaction in addition to which slowly moving metallic members insure against caking of the material against the container of the apparatus either in its raw state or at any intermediate stage of the reaction between the raw materials and finished products.

This invention is an improvement over the apparatus shown in my pending application for patent S. No. 696,485 filed March 3, 1924, and includes several novel features of construction and arrangement of parts whereby leakage of gases is wholly eliminated and the heat is applied to the apparatus in a relatively simple effective manner.

For an understanding of the invention by means of which the purposes described, as well as many others not at this same time specifically stated, reference may be had to the following description and accompanying drawings, in which, Fig. 1 is a central longitudinal vertical section through the apparatus.

Like reference characters refer to like parts in the different figures of the drawings.

Figure 1:
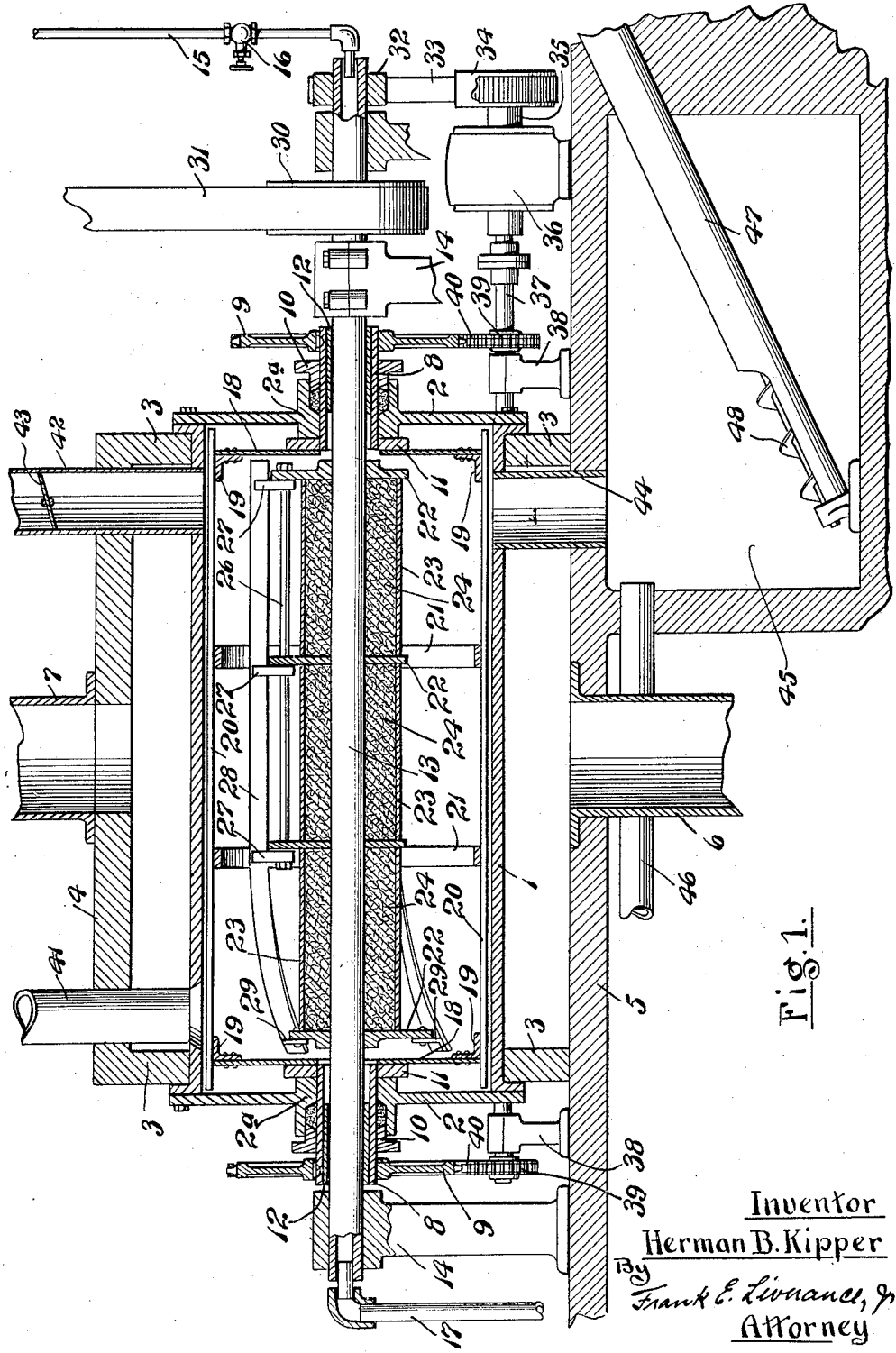
Figure 2:
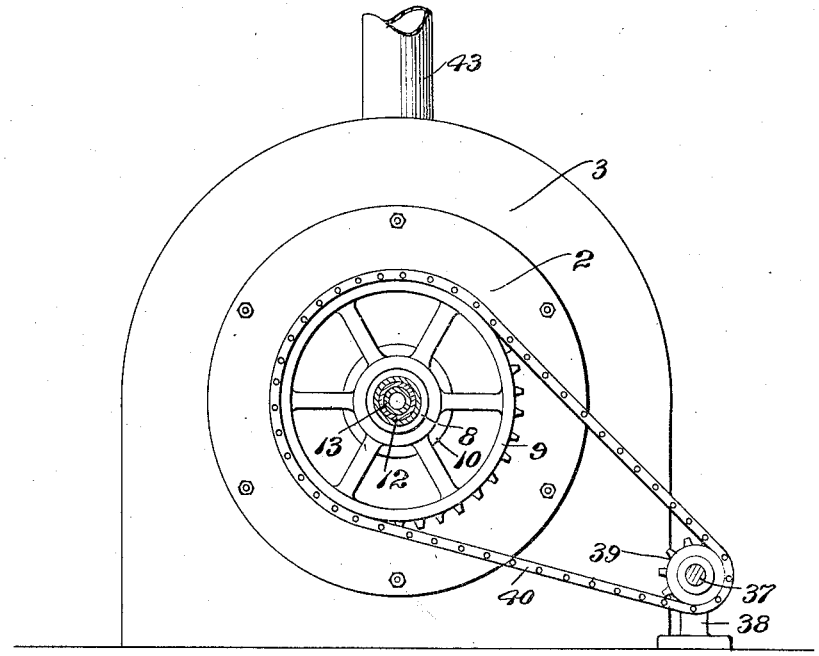
Fig. 2 is an end elevation thereof.
Figure 3:
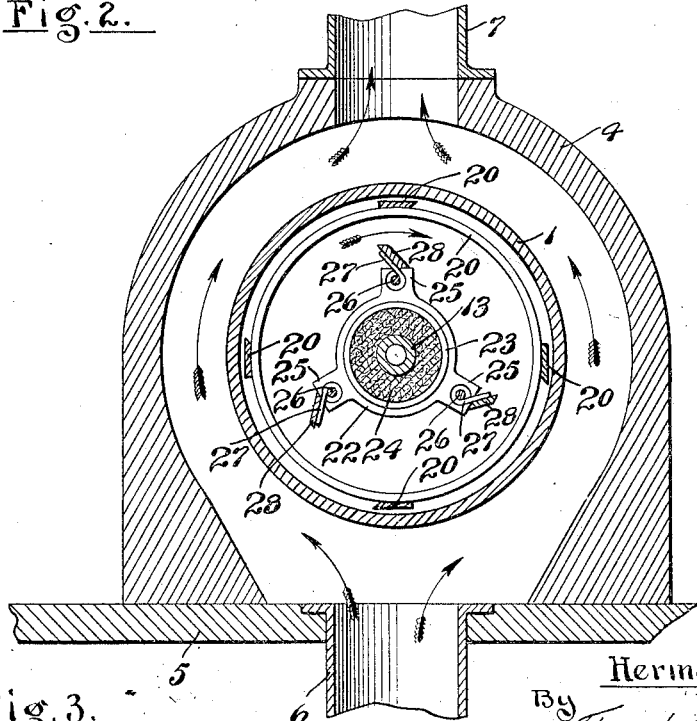
Fig. 3 is a transverse vertical section through the apparatus substantially midway between its ends.

In construction, the apparatus includes a cylinder 1 of metal, the ends of which are closed by plates 2 permanently secured thereto. The drum is mounted horizontally in a suitable furnace having vertical ends 3 and sides and top 4, the ends of the drum or cylinder extending through openings in the ends 3 of the furnace, and there being clear space around the drum between it and the sides of the furnace. The furnace rests on a suitable floor or other support 5. An inlet pipe 6 passes through the floor to said inner space and an outlet pipe 7 leads from the top of the furnace, it being understood that any suitable fuel, such as producer gas, may be fed through the pipe 6 to the furnace and burned around the cylinder 1, the products of combustion passing outwardly through the pipe 7.

Each of the end plates 2 has a centrally located hub $2^a$ through which a sleeve 8 passes. A relatively large sprocket wheel 9 is fastened to the outer end of each sleeve. The hubs $2^a$ at their outer portions are adapted to receive packing and suitable packing glands 10 making a gas tight construction so that gases from it within the cylinder 1 cannot escape through the ends. This is very necessary as the gases from within the cylinder are often, of a poisonous or otherwise harmful nature. At the inner end of each sleeve 8 a ring or collar 11 is permanently secured and bears against the inner end of the adjacent hub $2^a$. Within each sleeve 8 a second shorter sleeve 12 is located being disposed at the outer end portion of the sleeve 8. A hollow shaft 13 extends centrally through the cylinder 1 passing through both of the sleeves 12 as shown. This shaft is supported in bearings at the upper ends of suitable posts 14. Water is conducted to one end of the shaft through a pipe 15 in which a valve 16 is located to control the supply, the opposite end of the shaft having a waste pipe 17 for carrying the water away after it has passed through the shaft.

Within the cylinder 1 adjacent each end thereof a circular plate 18 is attached to each of the collars 11 and the same extend nearly to the inner surface of the cylinder 1. Rings 19 formed from angle bars are attached to the inner sides to the plates 18 and scraper bars 20, which are shown as four in number, are disposed between and connected to the horizontal legs of these angle bar rings 19. These scraper bars lie close to the inner surface of the cylinder 1 and are reinforced and connected together at points between their ends by rings 21 as shown. It is evident that when the scraper bars are moved over the inner surface of the cylinder the same act to scrape such surface and keep it clean of any materials which may be disposed to bake or cake thereon.

At spaced apart distances on the shaft 13 a number of disks 22 are secured, between which are located cylinders 23 of metal, the spaces between the shaft and the cylinders being filled with heat insulating material 24 so that the shaft is kept as cool as possible. Each disk 22 has a number of radially projecting ears 25 and through ears of three of the four disks shown rods 26 extend. Fingers 27 are pivotally mounted on the rods and at their outer ends are connected to metal bars 28. One of the disks 22 near one end of the cylinder 1 is eccentrically located on the shaft and the bars are curved as shown and connected at their ends to brackets 29 which in turn are secured to the end disk 22.

A pulley 30 is secured near one end of the shaft 13 being driven by a belt 31 from any suitable source of power. A smaller pulley 32 is connected to the shaft and by means of a belt 33 drives a pulley 34 secured to a shaft 35 which in turn, through suitably interposed reduction gearing located within the housing 36, drives a shaft 37 at relatively slow speed. The shaft 37 is located to one side and near the bottom of the enclosing furnace being mounted in bearings at the upper ends of short posts 38 one of which is located near each end of the apparatus. Two sprocket wheels 39 are attached to shaft 37 in the same vertical planes with the sprocket wheels 9 previously described; and chains 40 pass around the wheels 39 and 9 as shown.

A feed pipe 41 passes through the top 4 of the furnace construction and through the upper side of the cylinder 1 through which the materials to be treated may be introduced into the cylinder. At the opposite end and at the upper side of said cylinder 1 a vertical pipe 42 is located which extends upwardly through the top 4 of the furnace and in which a shut-off damper 43 is movably mounted. In the same end of the cylinder, but at the lower side, an outlet pipe 44 leads from the cylinder downwardly through the floor 5 to a chamber 45 into which the products obtained are passed. The gaseous products passed to the chamber may be lead therefrom through a pipe 46 while the solid matter falls to the lower side of the chamber and may be conveyed therefrom through a pipe 47 in which a suitable screw conveyor 48 is mounted.

This apparatus may be used in carrying out several processes. For the production of sodium sulphide, sodium sulphate and coke finely ground and mixed together are fed through the pipe 41 and heat is applied to the cylinder 1 by burning a suitable fuel within the furnace around the cylinder so that the temperature is raised from 300 to 600 degrees C. It is evident that the shaft 13 directly driven by the belt 31 rotates at comparatively high speed and the bars 28 beat against the material and maintain it in a finely divided and pulverized form. At the same time the sleeves 8 to which the bars 20 are connected move at a much slower speed but sufficient to keep the sharpened edges of the bars moving continuously over the inner surface of cylinder 1, the materials not being permitted to cake together against the walls of the cylinder but are continually stirred and agitated and simultaneously subjected to the beating action of the beater bars 28. The curved formation of the bars 28 at the entry end of the cylinder has the effect of moving the material from said end toward the delivery end.

Sodium sulphate constitutes what is known as the "salt-cake" of commerce. Sodium acid sulphate or sodium hydrogen sulphate contains about 40% free sulphuric acid and commercially is known as "niter-cake" although the commercial "niter-cake" usually contains about 30% of this free sulphuric acid. I have found that after the "niter-cake" is ground and mixed with soda ash in the required proportions so as to neutralize the free sulphuric acid and the mixture is passed through the apparatus heated to a temperature of 200 to 500 degrees C. the fully neutralized sodium sulphate or "salt-cake" of commerce is produced. This neutralization and the reaction required may be carried out at exceedingly high speed. For instance, in the apparatus which has been described and in which the cylinder is a tube eight feet long by thirty inches in diameter a production of four tons an hour or approximately 100 tons a day has been secured.

Where alkali cyanides are to be produced the raw materials such as sodium carbonate, or a mixture of sodium carbonate or potassium carbonate, together with coke and iron finely ground and mixed together are fed into and through the apparatus and nitrogen is at the same time forced through it. External heat is applied to the cylinder 1 and the temperature raised to from 600 to 1000 degrees C. The alkali cyanides fall to the chamber 45 and are withdrawn by means of the screw conveyor described and the excess nitrogen gas is removed from the chamber through the outlet pipe 45.

For the conversion of sulphur dioxide to sulphur anhydride, the sulphur dioxide mixed with air to supply the requisite amount of oxygen is forced through the apparatus which is partly filled with finely divided ferric oxide. The apparatus is externally heated to a temperature approximating 500 degrees C. and the sulphuric anhydride may be driven from the apparatus through the pipe 42, damper 43 being open to permit its escape.

The decomposition of iron sulphate, commercially known as copperas, to produce iron oxide or red iron pigment, is attained by passing the iron sulphate through the apparatus at a temperature of from 400 to 600 degrees C. Sulphur trioxide or sulphur anhydride is given off and drawn off through the pipe 42 while the iron oxide pigment is deposited in the chamber 45.

It is also possible to reduce various metallic oxides such as zinc or iron oxide with carbon, the two being mixed together and passed through the apparatus at a temperature of from 500 to 1000 degrees C., the reduced metal being received in the chamber 45 while carbon monoxide is removed either through the pipe 46 or the pipe 42.

A few of the different processes which may be carried out by this apparatus have been outlined. But it is to be understood that the apparatus is in no sense limited in use to the specific processes described. The construction is relatively simple and easy to manufacture and any parts which may become defective are easily repaired or replaced. It will be noted that the central shaft 13 is cooled by water circulating through it and is further protected from the heat in the cylinder portion of the apparatus most of its length by the heat insulating material 24. The bearing sleeves 12 are located as far to the outside as possible so that the same are not materially affected by the heat and these sleeves are subjected to the cooling of the water passing through the shaft 13. The pipes 42 and 44 in some instances may not both be needed and the invention contemplates an elimination of either one or the other of these outlets if the circumstances permit.

A modification of the specific structure shown and described which has not been deemed necessary to illustrate in the drawing is the extension of the sleeves 8 into the bearings 14 whereby the sleeves are supported and rotate within said bearings and the water cooled shaft 13 is journaled in the bushing 12 within the sleeves. It is sometimes more expedient to manufacture the device in this way and this modification in structure does not in any way affect the operation.

The device has been shown and described as being located horizontally because it will function more efficiently in this position but it is quite possible to operate it in a vertical or angular position and any such position is to be considered as being contemplated.

The exact shape or construction of the bars 28 used to beat the material and the method of mounting them is not necessarily that shown and described. Various types of beaters may be used some of which have been illustrated in other of my co-pending applications pertaining to this same type of device.

The invention is defined in the appended claims and is to be considered as comprehensive of all forms of structure coming within their scope.

I claim:

1. In combination, an elongated hollow cylinder having closed ends fixed thereto, inlet and outlet conduits at opposite ends of the cylinder, a sleeve passing through and rotatably mounted in each end of the cylinder, circular plates within the cylinder attached one to the inner end of each sleeve, beveled scraper bars located closely adjacent the inner side of the cylinder and lengthwise thereof, said bars being connected at their ends to said plates, means for applying heat to the cylinder, a shaft passing through said sleeves and through said cylinder, means for driving the shaft at relatively high speed, means for driving the sleeves at low speed, a plurality of spiders extending from the shaft, each of said spiders having radially extending arms, beater bars located lengthwise of and at the outer ends of corresponding arms of the spiders, and means for pivotally mounting the beater bars on said arms, said bars at their inner edges adjacent the ends of the arms being beveled to engage against the ends of said arms and thereby position the bars in planes located at an acute angle to the longitudinal axis of said arms.

2. In combination, an elongated hollow cylindrical container having closed ends fixed thereto, said container having an inlet at one end and an outlet at the opposite end, a sleeve passing through and rotatably mounted in each end of the container, sprocket wheels attached one to the other end of each sleeve, a shaft rotatably mounted lengthwise of and outside the container, sprocket wheels thereon, chains passing around the wheels on the shaft and sleeves, means for driving the shaft at low speed, scraper bars within the container adjacent their inner sides connected to said sleeves to move therewith, a shaft located horizontally through said sleeves, spiders located in spaced apart relation on said shaft within the container, beater bars pivotally mounted on said spiders to turn about horizontal axes and located lengthwise of the container, sleeves between adjacent spiders around said shaft, and heat insulating material housed within said sleeves and between the spiders around the shaft.

3. In an apparatus of the class described, an elongated horizontally located cylinder, and plates connected to the cylinder and closing the ends thereof, said cylinder having inlet and outlet conduits adjacent opposite ends, a shaft extending horizontally through the cylinder, spiders extending from the shaft, one of said spiders adjacent the inlet end of the cylinder being eccentrically positioned on the shaft, a plurality of spaced apart beater bars attached to said spiders, said bars adjacent the inlet end of the cylinder being bent to connect with the eccentrically mounted spiders whereby material entered into the cylinder is automatically moved toward the outlet and on rotation of said shaft, means for driving the said shaft at a high rate of speed, and scraper bars mounted to scrape the inner walls of said cylinder, combined with means for applying heat to the cylinder.

4. An apparatus of the class described comprising, an elongated horizontally located cylinder, plates closing the ends thereof and permanently connected thereto, said cylinder having inlet and outlet openings at opposite ends, means for continuously stirring and agitating the materials within the cylinder and simultaneously moving the same lengthwise of the cylinder from the inlet toward the outlet opening, means for simultaneously and continuously scraping the inner walls of the cylinder, and means for applying heat to said materials while within the cylinder.

5. An apparatus of the class described comprising, an elongated horizontally located cylinder having closed ends, said cylinder having inlet and outlet conduits at opposite ends thereof, a shaft extending lengthwise of the cylinder, means for driving said shaft at high speed, beater bars connected to the shaft and spaced therefrom and from each other, said bars adjacent the inlet end of the cylinder being curved away from the longitudinal axis of the main body of said bars to thereby provide a means for conveying the material from the inlet toward the outlet end of the cylinder, scraper bars mounted to move closely adjacent the inner walls of the cylinder, and means for moving said scraper bars over the inner walls of the cylinder at low speed.

6. In combination, an elongated hollow cylindrical container having closed ends fixed thereto, inlet and outlet conduits at opposite ends of the container, a sleeve passing through and rotatably mounted in each end of the container, members within the container attached, one to the inner end of each sleeve, scraper bars located closely adjacent the inner sides of the container and lengthwise thereof, said bars being connected at their ends to said members, means for applying heat to said container, a shaft located lengthwise of said sleeves and extending through the container, spiders extending from the shaft, beater bars pivotally mounted on the spiders, means for driving said shaft at high speed, and means for driving the sleeves at low speed.

7. In combination, an elongated hollow cylinder container having closed ends fixed thereto, said container having inlet and outlet conduits at opposite ends, a shaft extending lengthwise of the container, spaced apart spiders attached to said shaft, beater bars pivotally connected to said spiders, heat insulating means covering said shaft within the container, means for driving the shaft at high speed, sleeves in the end of the container through which the shaft passes, a plurality of scraper bars extending lengthwise of the container and closely adjacent the inner walls thereof connected with said sleeves, and means for driving said sleeves from said shaft at a low rate of speed, substantially as described.

In testimony whereof I affix my signature.

HERMAN B. KIPPER.